E. BOURNE.
Rotary Cultivator.
No. 107,218. Patented Sept. 13, 1870.
Fig. 1
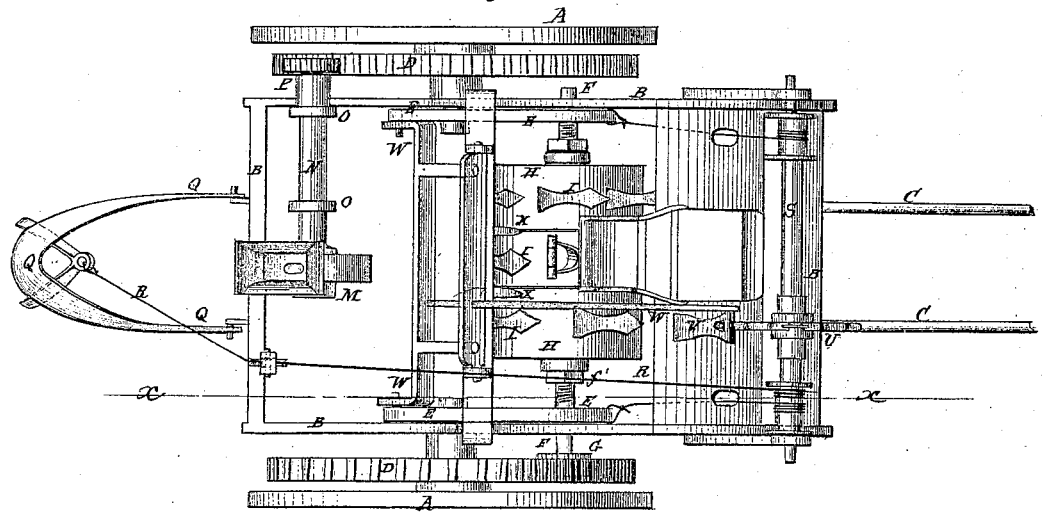
Fig. 2
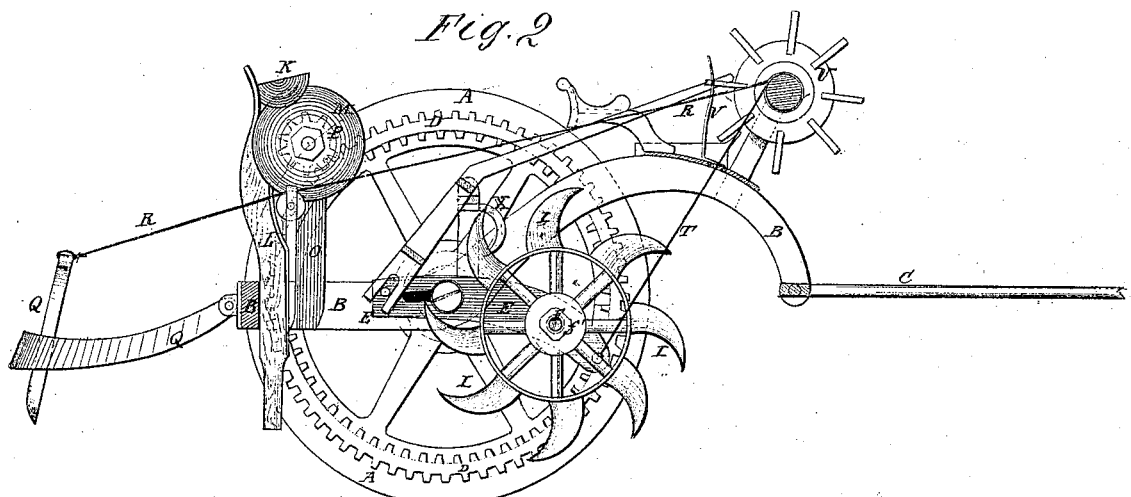
Fig. 5    Fig. 3    Fig. 4
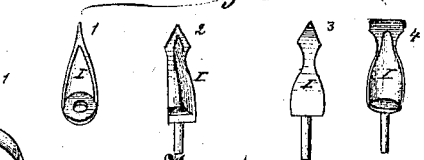
Witnesses:
A. W. Almqvist
Alex F. Roberts
Inventor:
E. Bourne
Per Munn & Co.
Attorneys.
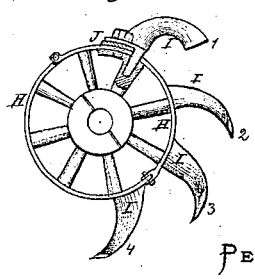

UNITED STATES PATENT OFFICE.

ELIJAH BOURNE, OF NEW IBERIA, LOUISIANA.

IMPROVEMENT IN PLOWS, PLANTERS, AND CULTIVATORS.

Specification forming part of Letters Patent No. 107,218, dated September 13, 1870.

*To all whom it may concern:*

Be it known that I, ELIJAH BOURNE, of New Iberia, in the parish of Iberia and State of Louisiana, have invented a new and useful Improvement in Plow, Planter, and Cultivator; and I do hereby declare that the following is a full, clear, and exact description thereof, which will enable others skilled in the art to make and use the same, reference being had to the accompanying drawings, forming part of this specification, in which—

Figure 1 is a top view my improved machine. Fig. 2 is a longitudinal section of the same, taken through the line $x\ x$, Fig. 1. Fig. 3 is a detail sectional view of the central or detachable section of the plow-cylinder. Fig. 4 is a detail rear view of the four plows shown in side view in Fig. 3. Fig. 5 is a side view of the plow-cylinder shaft.

My invention has for its object to furnish an improved machine which shall be so constructed and arranged that it may be readily adjusted for use for preparing the ground, planting the seed, and cultivating the crop, and which shall be convenient in use and effective in operation in either capacity; and it consists in the construction and combination of the various parts of the machine, as hereinafter more fully described.

A are the drive-wheels, the journals or axles of which are connected with the side bars of the main frame B. The forward part of the frame B is curved upward, as shown in Fig. 2, to furnish a free space for the plows to operate in, and to the forward end of which frame the draft-bar C is attached.

To the inner sides of the wheels A, or to the journals of said wheels, are attached gear-wheels D, so that the said gear-wheels may be carried around with and by the said drive-wheels A in their revolution. The gear-wheels D are made with teeth upon both their concave and convex sides, as shown in Fig. 2, and for the purpose hereinafter described.

E is the inner frame, which is pivoted et the inner ends of the journals of the drive-wheels A, or to the side bar of the frame B, the ends of the journals or pivoting-bolts passing through slots in the side bars of the frame E, so that the said frame may be slid back and forth upon its pivots.

F is the shaft to which the plow-cylinder is attached, and to the end or ends of which are attached small gear wheels G, the teeth of which mesh into the teeth of the gear wheel or wheels D.

H is the plow-cylinder, which is made in three or more sections, which sections are secured to the shaft F by a groove and key, so as to be carried with the said shaft in its revolution, and they are pressed close together by nuts $f'$, screwed upon screw-threads cut upon the end parts of said shaft F, as shown in Figs. 1, 2, and 5.

The shaft F is made with two collars, $f^2$, upon its middle parts, as shown in Fig. 5, to assist in centering the sections, and to support the inner end of the hubs of the side sections when the central section is detached to adapt the machine for use as a cultivator. The sections of the cylinder H are all formed by connecting the rims or shells of said sections to their hubs by tubular spokes. The central section of the cylinder H is made in two parts hinged to each other, as shown in Fig. 3, so that it can be detached, when desired, without detaching the other or end sections. The plows I are made with shanks upon the forward part of their bases or the tops of their standards, which shanks pass through holes in the rims or shells of the cylinder and enter the hollow spokes of said cylinder, as shown in Fig. 3, the rear parts of said bases or upper ends resting upon the surface of the cylinder, and thus assist in supporting the draft-strain upon the shanks; or, if desired, the plows may be provided with a seat, J, interposed between their bases and the surface of the cylinder, and may be secured in place by a screw passing through the rear part of the said bases, through the said seat J, and into or through the rim or shell of the cylinder, as shown in Fig. 3. This enables the depth at which the plows work in the ground to be regulated by interposing blocks of a less or greater thickness between the seat J and the base of the plows I. The plows I are made of different forms to adapt them for the particular work for which the machine is to be used. Plow 1, Figs. 3 and 4, is made with a vertical cutter upon its forward end or point, as shown in Figs. 3 and 4, to cut off roots and other obstructions that might impede the action of the plows. The plows marked 2, Figs. 3 and 4, are twin plows, and are designed for attachment to the cylinder when the machine is to be used as a cultivator to throw the soil toward or from the plants, as may be desired. The plows marked 3, Figs. 3 and 4, and the plows shown in Figs. 1 and 2 are digging-plows for ordinary plowing or digging. The plows marked 4, Figs. 3 and 4, are designed for use for cutting off the stumps or stubble of cane.

K is the seed-hopper, which is attached to and supported by the standard L, attached to the rear part of the frame B. The standard L extends below the frame B, and is made hollow, so as to serve at the same time as a standard to support the hopper K, and as a spout to conduct the seed to the ground.

M is the dropping-wheel, which fits into an opening in the bottom of the hopper K, so as to take the seed from the said hopper K and convey it to the conductor-spout L. The cavities in the wheel M that receive the seed are made partly in the body of the said wheel and partly in a band passing around said wheel, and secured by a screw, so that by moving the said band the capacity of the said cavities may be adjusted at will. The dropping-wheel M is formed solid upon or rigidly attached to the inner end of the short shaft N, which revolves in standards O, attached to the rear part of the frame B, and to its outer end is attached a small gear-wheel, P, the teeth of which mesh into the outer teeth of one of the gear-wheels D, so that the seed may be dropped by the advance of the machine.

Q is the coverer, which is formed by attaching two covering-plows to a bow or arm hinged or pivoted to the rear end of the frame B, so that the said covering-plows may turn inward the sides of the furrow opened by the furrowing-plows.

To the rear end of the coverer Q is attached one end of the cord R, which passes over a guide pulley or pulleys pivoted to standards attached to the frame B, and the forward end of which cord is attached to the shaft S, which revolves in standards attached to the forward part of the frame B.

T is a cord or cords, the lower end or ends of which are attached to the forward end of the frame E, and the upper end or ends of which are attached to the shaft S so that by revolving the shaft S the cords R and T may be wound upon it and the coverer Q and plow-cylinder and plows may be raised from the ground. The shaft S is revolved by a hand-wheel, U, attached to it, and may be held in any desired position by a spring-catch, V, taking hold of the said hand-wheel.

W is a lever pivoted to the frame B or to supports attached to said frame. The upper end of the lever W extends up into such a position that it may be conveniently reached and operated by the driver from his seat. The lower or branched end of the lever W is connected with the rear end of the frame E, so that by operating the said lever W the gear-wheels G may be thrown out of and into gear with the gear-wheels D, as described.

X are the fingers attached to the frame B or to supports attached to said frame, to clean off any weeds, grass, or other obstruction that may be raised by the plows, and which might impede or obstruct their working.

Having thus described my invention, I claim as new and desire to secure by Letters Patent—

1. The detachable rotary plow-stock H, formed in two parts, hinged together, and constructed with tubular spokes, as described.

2. The arrangement of double spur-wheel D, pinions P G, seed-dropper M, and rotary plows I, operating as described.

The above specification of my invention signed by me this 1st day of February, 1870.

ELIJAH BOURNE.

Witnesses:
  GEO. W. MABEE,
  JAMES T. GRAHAM.